Sept. 22, 1970         K. J. REICHL         3,530,021
METHOD OF PRODUCING FIBER-REINFORCED PANELS OF SYNTHETIC RESIN
Filed Dec. 5, 1966
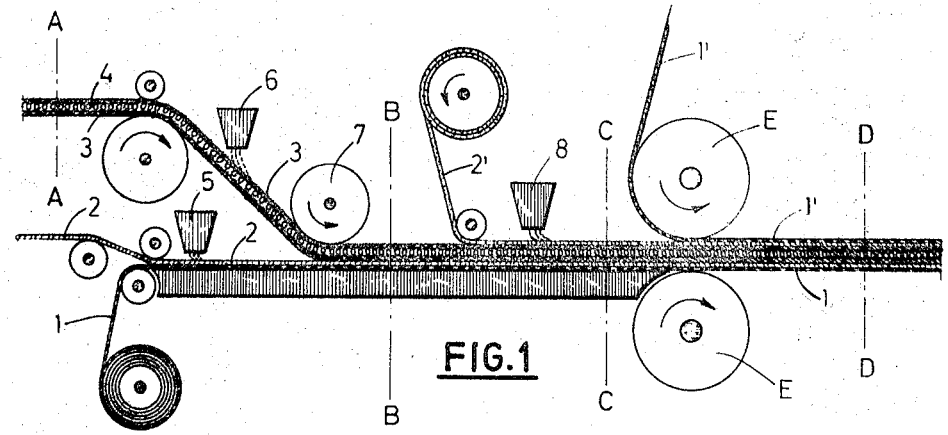
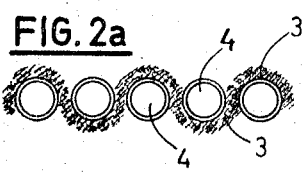
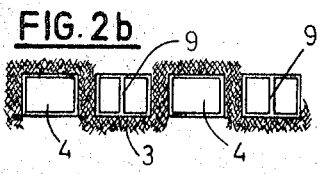
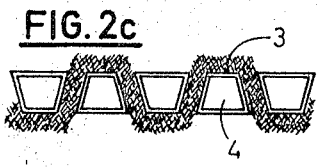
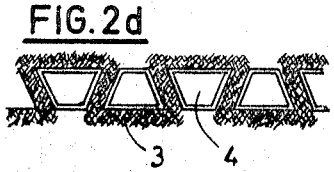
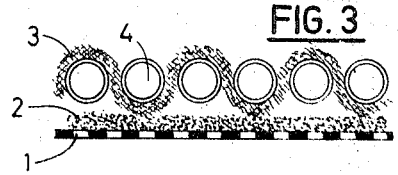
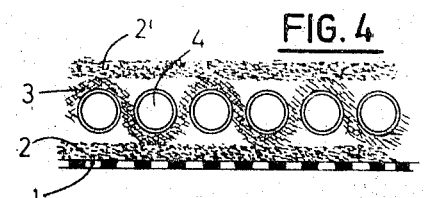
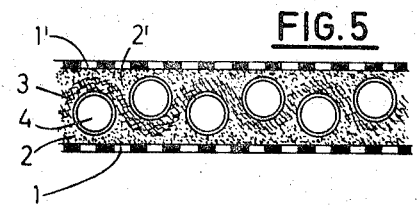
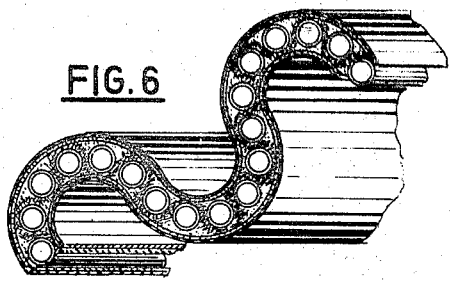
INVENTOR:
KARL JOHANN REICHL
BY
ATTORNEY United States Patent Office 3,530,021
Patented Sept. 22, 1970

3,530,021
METHOD OF PRODUCING FIBER-REINFORCED PANELS OF SYNTHETIC RESIN
Karl Johann Reichl, Regensburger Str. 4,
Weiden, Upper Palatinate, Germany
Filed Dec. 5, 1966, Ser. No. 599,075
Claims priority, application Germany, Dec. 16, 1965,
D 48,925
Int. Cl. B31f 1/22
U.S. Cl. 156—206                    14 Claims

ABSTRACT OF THE DISCLOSURE

A method of producing, in a continuous-motion process, fiber-reinforced hollow panels, their multiple longitudinal cavities being either the hollow interior of tubular spacer profiles, or the channels left after removal of the spacer profiles from the finished panels. A central fiber web is deformed to receive, in alternate positions on either side, flexible but generally non-deformable spacer tubes, to both sides thereof is applied an additional fiber web, all the layers are impregnated with a hardenable liquid resin, and both sides are covered with a skin layer.

BACKGROUND OF THE INVENTION

Field of the invention

The present invention relates to a method of producing fiber-reinforced panels or the like of synthetic resin in which the outer layers of each panel are connected by longitudinally extending internal webs for reinforcing the panel and preferably also for defining continuous longitudinal channels within each panel and for separating these channels from each other.

Description of the prior art

Considerable improvements have in recent times been made in producing hollow glass-fiber reinforced panels or the like of the type as mentioned above. Such panels have the advantage that, despite their large outer surfaces, they are very light and have a very high resistance and may be produced far more easily and at a much lower cost than, for example, the so-called sandwich board as disclosed, for example, in the French Pat. No. 1,246,492, in which a honeycombed insert is provided between a pair of outer cover sheets.

There are presently two methods known for producing hollow panels of the above-mentioned type. They are described in the Belgian Pat. No. 630,654. One of these methods consists in forming the usual laminate from two superimposed resin-impregnated layers of a fibrous material which are provided with cover sheets and between which flattened flexible tubes are inserted which are spaced from each other. These tubes are then expanded between the fiber layers by means of a liquid or gaseous medium so as to press the fibrous layers against the inner surfaces of a mold. After being thus expanded, the tubes form channels within the panel which are separated by longitudinal webs from each other. The fibrous material is then hardened within the mold so that it retains its shape. This method may be carried out either in a fixed position by an intermittent production of individual panels or continuously while feeding the fibrous layers together with the tubes in one direction. By providing more than two impregnated layers of fibrous material above each other and several layers of tubes between them, it is also possible to produce panels with channels of different sizes and shapes.

According to the second of these known methods, the channels within each panel are formed by freely suspended rigid or elastic elements which are inserted between the layers of the panel by moving these layers relative to these inserts. By increasing the number of fibrous layers and arranging the inserts within different planes, it is also in this case possible to provide such panels with internal webs and channels of different shapes.

Both of these known methods have the advantage of permitting the fibrous material to be freed of trapped air by subjecting it to a squeezing process before the channels are formed therein, so that a nonporous product may be attained.

Although generally these two methods produce very good results, they are for some purposes not entirely satisfactory. This applies particularly if very thin internally webbed panels or the like are to be produced, for example, of a thickness of 8 to 15 mm. Assuming, for example, that approximately 100 parallel longitudinal webs are to be formed within a thin panel of a width of 1 meter, it will be clear that a proper insertion of so many flattened flexible tubes of a small diameter at the required distances from each other would be practically impossible or that such a production would at least be very uneconomical. The arrangement of freely suspended elements of such a small thickness and so closely adjacent to each other for insertion into the panels would also hardly be possible.

SUMMARY OF THE INVENTION

It is therefore an object of the present invention to provide a new method of producing either thick or thin fiber-reinforced panels or the like of synthetic resin which are provided with internal connecting webs for reinforcing the panel and preferably also for defining longitudinal channels within each panel, and wherein either a large number of longitudinal webs are formed for producing thin panels or a smaller number of webs longitudinal for producing thicker panels.

In principle, the invention consists of inserting a plurality of pressure-resistant tubes or rods parallel to and at equal distances from each other between two resin-impregnated layers of a fibrous material, preferably of glass fibers, which are protected by cover sheets.

It is evident that it does not involve any particular difficulties to deposit, for example, 100 tubes of a small diameter upon a resin-impregnated fiber layer of a width of, for example, 1 meter so as to extend parallel to and at equal distances from each other in the longitudinal direction of this layer. This operation is especially simple if it is carried out while the fiber layer is held in a stationary position. Only a simple device would then be required which grips the tubes and deposits them in the proper position upon the fiber layer.

It is, however, a particular advantage of the present invention that the new method may also be carried out in a very simple manner so as to produce hollow, web-reinforcedpanels or the like in a continuous production. This continuous method consists in principle of depositing the pressure-resistant tubes in the longitudinal direction upon a resin-impregnated fiber layer while the latter is being fed in this direction, and in then covering these tubes with a second impregnated fiber layer which is fed at the same speed as the first layer. This is a very simple operation which may be carried out at a low expense and only requires relatively simple means for feeding the tubes continuously or in the form of successive sections upon the lower fiber layer so as to extend in the longitudinal direction thereof and parallel to and at equal distances from each other in the transverse direction of both fiber layers.

The web-forming tubes may either remain within the finished panels so as to form longitudinal channels therein and to reinforce the panels in the event that the panels should have a very high mechanical resistance, or they may be pulled out of the otherwise finished panels after the latter have been cut to the desired lengths so that merely the webs which are formed between the tubes remain in the panels. If these inserts are to be subsequently pulled out of the finished panels, they may also consist of full rods. Furthermore, if the panels instead of being hollow should be of an extremely high resistance, these full rods may also be left within the panels.

Although it might appear that the new method is uneconomical because it requires, for example, 100 m. of tubular or rod material for producing a panel of a length of 1 m. and a width of 1 m., it has been found by calculation and tests that the product which is obtained by this method is of such a high quality that it is worth-while to incur the additional costs of the tubular or rod material.

Furthermore, if the fiber layers are transparent and the inserts remain within the panels and are suitably colored, very desirable artistic effects may be obtained.

The cross-sectional shape of the longitudinal channels which are to be formed between the connecting webs within the panels depends upon the cross-sectional shape of the inserts which may be, for example, of a circular, square, rectangular, trapezoidal, rhomboidal, or any other desired shape.

Assuming, for example, that a large number of cylindrical tubes are inserted at equal distances from each other between the resin-impregnated fiber layers of a panel, the adjacent tubes will be separated by gaps with semicircular sides and of a size depending upon the distance between the tubes. Since the impregnated fibrous material which is used for producing such panels usually consists of relatively stiff fiber mats, for example, of glass fibers, the fibrous material may sometimes not fill out these gaps completely or its density therein may be insufficient after the mats with the tubes between them have been passed through one or more pairs of squeezing rollers. It may then also occur that these gaps will be partly filled only with the synthetic resin with which the fiber mats are impregnated and that consequently the adjacent tubes within the panel will be separated by a strip of a considerably lower mechanical resistance.

It is a further object of the present invention to overcome this disadvantage by filling these gaps between the adjacent tubes with web material having a resistance or density substantially as high as that of trhe outer fiber mats. For attaining this object, the invention further provides that at least three fiber mats are employed for producing a panel, that one of the fiber mats before being impregnated is provided with longitudinally extending corrugations, and that the tubular inserts are partly embedded in the troughs of these corrugations. This fiber mat with the tubes therein is then impregnated from above with synthetic resin and deposited upon another freshly impregnated fiber mat. Thereupon a third fiber mat is applied upon the upper side of the corrugated fiber mat and the tubes deposited therein, and it is thereafter likewise impregnated. When the combined layers with the tubes therein are then passed through a pair of squeezing rollers, the gaps between the adjacent tubes will be completely filled with impregnated fibrous material which has a density and mechanical resistance substantially equal to that of the covering mats.

BRIEF DESCRIPTION OF THE DRAWING

The features and advantages of the present invention will become more clearly apparent from the following detailed description thereof which is to be read with reference to the accompanying drawings, in which—

FIG. 1 shows a diagrammatic layout of the principal parts of an apparatus for carrying out the inventive method continuously;

FIGS. 2a to 2d show cross sections which are taken along the line A—A of FIG. 1 of a fiber mat of a corrugated shape with tubular inserts of different cross-sectional shapes;

FIGS. 3, 4, and 5 show cross sections which are taken along the lines B—B, C—C, and D—D, respectively, of FIG. 1; while FIG. 6 shows in perspective a cross-sectional portion of a longitudinally corrugated panel which is produced by the new method.

DESCRIPTION OF THE PREFERRED EMBODIMENTS

Assuming that inserts 4 of a circular cross section as shown in FIG. 2a are to be employed, these inserts which preferably consist of flexible but pressure-resistant tubes but may in certain cases also consist of flexible solid rods are fed in their longitudinal direction and are partly embedded in the troughs of the longitudinal corrugations of a dry fiber mat 3 at an area of the apparatus preceding the line A—A in FIG. 1. Obviously, in its original flat condition, the fiber mat 3 has a considerably greater width than after the longitudinal corrugations are formed therein. The particular manner in which these corrugations are formed in the mat 3 and in which the tubes 4 are embedded therein does not constitute a feature of this invention. The fiber mat 3 may be made of a corrugated shape, for example, in any conventional manner by corrugating rollers or the like or the corrugations may be formed by means of the tubes themselves by pressing the alternate tubes 4 against the upper and lower sides of the fiber mat 3 until all tubes are disposed within the same level. When it enters the area A—A, the corrugated fiber mat 3 with the tubes 4 therein has the normal width for feeding it by feed rollers into the actual molding apparatus as shown in FIG. 1 in which it is then impregnated at 6 with a liquid synthetic resin which is capable of hardening. At the same time, another but plane fiber mat 2 is continuously fed and applied upon the upper side of a cover sheet 1 which is drawn from a roll, and this fiber mat 2 is then likewise impregnated with synthetic resin at 5. The impregnated layer 3, 4 is then applied upon the impregnated layer 2 by a roller 7. The combined layers 3, 4 and 2 as illustrated in FIG. 3 then travel along to the next station where a further fiber mat 2' is applied upon the upper corrugations of the impregnated fiber mat 3. This third fiber mat 2' is then likewise impregnated with synthetic resin at 8. The combined layers as shown in FIG. 4 are then passed to a pair of squeezing rollers E where another cover sheet 1' is applied by the upper roller E upon the upper surface of the fiber mat 2'. All of the layers are then passed through and compressed by the squeezing rollers E so as to form a single compound layer, as illustrated in FIG. 5, which no longer contains any air spaces between the individual layers. This compound layer is finally passed to a hardening zone in which, if desired, it may also be formed into a special shape, for example, to a longitudinally corrugated shape as shown in FIG. 6.

The tubular inserts 4 may either be left in the finished product or, if desired, they may be pulled out of each panel after it has been cut off from the continuously produced compound layer.

As shown in FIG. 2b, the tubular inserts 4 may also have a rectangular shape, and every other insert is provided with a central reinforcing web 9 for increasing its resistance so as to withstand the pressure of the squeezing rollers E.

FIGS. 2c and 2d illustrate the use of trapezoidal tubular inserts 4 and differ from each other by the manner of embedding the inserts within the zig-zag-shaped fiber mat 3. According to FIG. 2c, the wider of the two parallel sides of each insert 4 remains uncovered by the fiber mat 3, while according to FIG. 2d each insert 4 is almost fully embedded within the fiber mat 3 since only the narrower of the two parallel sides of each insert remains uncovered. This may be of advantage if the tubular inserts are to be embedded as much as possible before the two other fiber mats 2 and 2' are applied thereon.

The tubular inserts 4 are preferably made of plasticized polyvinyl chloride, polyethylene, acetobutyrate, methacrylate, polyester, polystyrene, polyvinyl, fluoride, or the like. If the inserts 4 are to be pulled out of the otherwise finished product or if the are to remain therein in order to attain solid panels of high resistance, they may also consist of full rods which may be made of silicone rubber or of plasticized polyvinyl chloride. The particular kind of material to be employed for producing the inserts depends not only upon their required compressive strength but also upon whether they should be combined with the impregnated mat material 3 or whether they are to be pulled out of the otherwise finished product. The inserts 4 may also be made of a pressure-resistant thermoplastic and they may or may not be reinforced with glass fibers.

The material of the fiber mat 3 in which the inserts 4 are embedded preferably consists of glass fibers, although any other suitable fibrous material may also be employed which, if desired, may be reinforced with glass fibers.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A method of fabricating, in a continuous-motion assembly process, composite multi-layer panels having longitudinal cavities or light-weight spacer profiles disposed between mechanically resistant confining layers, comprising the steps of:
   (a) imbedding longitudinally in a first web of fiber material a plurality of longitudinally flexible, parallel spacer profiles so as to contact alternately the one or the other side of said first fiber web;
   (b) feeding said first fiber web and imbedded spacer profiles to an assembly station;
   (c) feeding to the assembly station a second continuous web of fiber material for assembly to one side of said first fiber web and imbedded spacer profiles;
   (d) feeding to the assembly station a third continuous web of fiber material for assembly to the other side of said first fiber web and imbedded spacer profiles;
   (e) impregnating the fiber webs with a liquid hardenable resin, thereby rendering the fiber webs easily deformable;
   (f) applying continuous skin layers to both sides of the combined layers of impregnated fiber webs; and
   (g) hardening the multi-layer assembly.

2. The method as claimed in claim 1, wherein the step (e) of impregnating is performed separately for each of the fiber webs.

3. The method as claimed in claim 1, further comprising the step of
   passing the multi-layer assembly through a roller station to remove entrappped air from between the layers before hardening thereof.

4. The method as claimed in claim 1, further comprising the step of
   preventing the spacer profiles from forming an adhesive bond or chemical interaction with the surrounding material by selecting for them a material which is inert to the impregnating liquid.

5. The method as claimed in claim 4, further comprising the steps of
   cross-cutting the continuously produced multi-layer assembly into distinct panel lengths; and
   removing said parallel spacer profiles from the cross-cut panels.

6. The method as claimed in claim 1, further comprising the step of
   passing the multi-layer assembly through a forming station to give the assembly a specific cross-sectional outline before hardening thereof.

7. The method as claimed in claim 6, wherein
   the step of giving the assembly a specific cross-sectional outline consists of transversely undulating the multi-layer assembly.

8. The method as claimed in claim 1, wherein the step (a) of imbedding the spacer profiles includes the separate steps of
   forming parallel recessions and ridges in a transversely alternating symmetric pattern in said first continuous fiber web; and
   placing said spacer profiles into the recessions thus formed on both sides of said first fiber web.

9. The method as claimed in claim 1, wherein the step (a) of imbedding the spacer profiles includes the separate steps of
   arranging approximately half the spacer profiles to one side of said first fiber web so that they are spaced apart by at least their transverse thickness plus twice the thickness of said fiber web;
   arranging the remaining spacer profiles to the other side of said fiber web and transversely between the spacer profiles on the opposite side; and
   forcing the spacer profiles thus positioned into the fiber web so as to deform the latter until the profiles are fully imbedded therein.

10. The method as claimed in claim 1, comprising the further steps of
    arranging the assembly station substantially horizontally, so that one of said skin layers is placed at the bottom of the multi-layer assembly and another skin layer is placed at the top thereof; and
    supporting the bottom skin layer on a stationary surface in the assembly station;
    the steps listed in the claim incorporated by reference herein being further defined, and performed in sequence, as follows:
    the step (c) including the step of depositing the second fiber web on top of the bottom skin,
    the step (e) including the step of depositing onto the second fiber web a predetermined amount of impregnating liquid, thereby rendering said second fiber web easily deformable,
    the step (b) preceded by the step (a), including the step of depositing the first fiber web and imbedded spacer profiles on top of the second fiber web,
    the step (e) further including the step of depositing onto the first fiber web and imbedded spacer profiles a predetermined amount of impregnating liquid, thereby rendering said first fiber web easily deformable,
    the step (d) including the step of depositing the third fiber web on top of the first fiber web and imbedded spacer profiles,
    the step (e) further including the step of depositing onto the third fiber web a predetermined amount of impregnating liquid, thereby rendering said third fiber web easily deformable,
    the step (f) including the step of depositing the top skin layer on the third fiber web.

11. The method as claimed in claim 10, wherein one of the separate steps of impregnating step (e), instead of following the step (b), is performed just prior thereto.

12. The method as claimed in claim 10, further comprising the step of
    passing the multi-layer assembly between a pair of horizontal squeezing rollers while the top skin layer is deposited by the upper one of the squeezing rollers, thereby causing said top skin layer to squeeze out any entrapped air.

13. The method as claimed in claim 3, wherein the spacer profiles chosen for imbedding into the first fiber web are of tubular cross-section and longitudinally flexible.

14. The method as claimed in claim 13, wherein at least some of the spacer profiles chosen for imbedding into the first fiber web are of a material and cross-section rendering the profiles resistant to permanent deformation during assembly.

References Cited

UNITED STATES PATENTS

| | | | |
|---|---|---|---|
| 2,454,719 | 11/1948 | Scogland | 156—210 X |
| 2,927,623 | 3/1960 | Huisman et al. | 156—462 X |

SAMUEL W. ENGLE, Primary Examiner

U.S. Cl. X.R.

156—210, 459, 470; 161—139